United States Patent [19]

Kuttler

[11] 4,201,111
[45] May 6, 1980

[54] SHEET METAL FASTENER AND METHOD OF MAKING

[75] Inventor: Otto Kuttler, Loerrach, Fed. Rep. of Germany

[73] Assignee: A. Raymond, Lorrach, Fed. Rep. of Germany

[21] Appl. No.: 866,257

[22] Filed: Jan. 3, 1978

Related U.S. Application Data

[63] Continuation of Ser. No. 753,443, Dec. 22, 1976, abandoned.

[51] Int. Cl.² ............................................. F16B 17/00
[52] U.S. Cl. ...................................... 85/32 V; 85/36
[58] Field of Search .................... 85/32 V, 36; 151/30, 151/15

[56] References Cited

U.S. PATENT DOCUMENTS

| | | | |
|---|---|---|---|
| 2,081,065 | 5/1937 | Place | 85/32 V |
| 2,103,833 | 12/1937 | Tinnerman | 85/36 |
| 2,435,079 | 1/1948 | Hotchkin | 85/32 V |
| 3,108,371 | 10/1963 | Munse | 85/36 |
| 3,523,299 | 8/1970 | Tinnerman | 85/36 |

FOREIGN PATENT DOCUMENTS 761771  11/1956  United Kingdom .................... 151/30

Primary Examiner—J. Franklin Foss
Attorney, Agent, or Firm—Finnegan, Henderson, Farabow, Garrett & Dunner

[57] ABSTRACT

A fastener including a sheet metal plate having a central stamped and apertured portion forming a screw thread, the aperture having a mean diameter sized approximately 5% less than the root diameter of a screw to be used therewith. The stamped portion is formed with a plurality of slits extending generally radially of the aperture and spaced equally around the thread to define a plurality of independent, generally equally sized sectors having contiguous edges and which sectors are adapted to tightly grip the root of the screw. In addition, a U-shaped, bent, sheet metal clamp adapted to slip over support bases to be fastened together is provided where the described sheet metal plate is one of the clamp's legs. The method of making this fastener includes the steps of forming the screw thread portion of the fastener in a metal plate, forming gapless slits in the screw thread portion, and forming a central aperture in the slitted screw thread portion.

4 Claims, 4 Drawing Figures

SHEET METAL FASTENER AND METHOD OF MAKING

This is a continuation of application Ser. No. 753,443, filed Dec. 22, 1976 now abandoned.

BACKGROUND OF THE INVENTION

The invention relates to a sheet-metal fastener or nut comprising a sheet-metal member having a central stamped and apertured portion forming a protuberance which is shaped to define an internal screw thread.

The invention in particular applies to sheet-metal nuts bent to a U-shape and adapted to slip over and clamp to the edge of a support base, provided with holes for receiving fasteners, for instance screws.

In that case, a screw is inserted through and against an aperture in the lower leg of the U-shaped nut and is pushed through aligned holes in support bases to be connected as far as the vicinity of the stamped portion thread. Using a simple tool, such as a screwdriver, the screw is rotated to threadedly engage the thread in the central stamped portion. Continued threading action of the screw draws the support bases gradually toward each other until ultimately they are compressed and fastened together. This is a lasting and secure connection, provided it be free from vibrations or impacts.

However such vibrations and impacts are unavoidable, for example, in a motor vehicle moving over uneven surfaces of a road. In such case the resulting vibrations cause loosening of the fastener because the thread is not selflocking. The screw then gradually backs out of this thread and the fastener connection ultimately is lost.

SUMMARY OF THE INVENTION

The purpose of this invention is to improve fastener connections of the above type so that the sheet-metal member selflocks in all positions of the screw to prevent vibrations and impacts from causing the tightened screw to turn and back itself out of the thread, and thereby preventing unintended loss of the connection between the support bases.

This problem is solved in this invention by forming the sheet-metal stamped portion so that the average diameter of the aperture which defines the fastener thread is about 5% less than the root diameter of the fastener screw to be used therewith, and further by providing sharp incisions or slits in the stamped portion extending generally radially of the aperture and evenly distributed around the periphery of the sheet-metal thread.

This construction perfects the thread in the sheet-metal fastener into a self-locking thread which is secure in every tightened position and depth of tightening for the screw engaged therewith, and which prevents undesired back-rotation of the screw on its own. This locking action on the screw against undesired back-rotation is further enhanced by providing that the sharp radial slits or incisions adjacent the aperture forming the thread are gapless and evenly distributed around the periphery of said thread. Thus, the circumference of the thread is divided into several sectors by these slits or incisions, the sectors having contiguous lateral edges. During tightening of the fastener-screw, these sectors extend into the threads and engage the core of the screw at the root diameter between thread crests. However, during such threading action, the core with its 5% greater diameter causes the sheet metal thread sectors to flex slightly and the slits to open slightly. When threading action of the screw ceases, an axial force is applied by the thread crest engaging to the sheet-metal thread sectors forcing them back toward their normal position. This causes the thread aperture to contract and the sectors to tightly grip the screw at its root. This, in effect, provides a braking or holding action on the screw for all threaded positions rendering the screw-fastener connection self-locking to prevent unintended back-rotation of the screw.

By virtue of the formed slits being gapless and the thread sectors flexing only to accommodate the core of the screw, a maximum portion of the periphery of the screw core is engaged by the thread sectors. This further enhances the gripping capability of the fastener of this invention.

dr

BRIEF DESCRIPTION OF THE DRAWING

The drawing shows two embodiments of the invention.

DETAILED DESCRIPTION OF THE DRAWING

Figure 1:
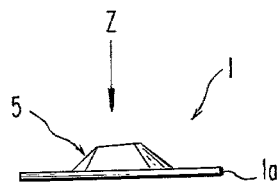
FIG. 1 is an elevational view of a sheet-metal fastener or nut forming the invention.
Figure 2:
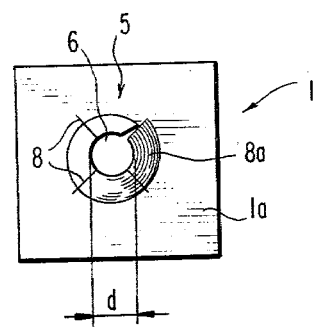
FIG. 2 is a top plan view of the sheet-metal fastener of FIG. 1.

Referring now to FIGS. 1 and 2 of the drawing, the self-locking sheet-metal fastener or nut of this invention is illustrated generally at 1 and includes a sheet-metal plate 1a. A center portion z of member 1a is stamped forming a protuberance shaped to define a thread generally indicated at 5. This thread 5 includes an aperture 6 having a mean diameter d which normally is about 5% less than the core or root diameter of the screw to be used together therewith. For clarity, the screw is omitted from representation in the drawing The thread 5 is formed with a plurality of sharp slits or incisions 8 which extend generally radially of aperture 6 and are distributed evenly around the periphery of thread. Slits 8 divide thread 5 into a plurality of independent and substantially equally sized sectors 8a the inner edges of which engage the root of the screw (not shown) threaded through aperture 6. Slits 8 are gapless, i.e. the lateral edges of sectors 8a are contiguous, as is shown in FIGS. 1 and 2.

In use, a screw (not shown) having a core or root diameter slightly larger than mean diameter d of aperture 6, is pressed against thread 5. When the screw is turned, generally using a screwdriver, the threads of the screw engage the threads, the inner edges of sectors 8a engaging the root of the screw between adjacent thread crests, and the screw feeds through aperture 6.

During the threading action, the core with its 5% greater diameter causes the sheet-metal sectors 8a to flex and the aperture 6 to expand slightly, by opening the gapless slits 8 slightly at the same time. However, when threading action on the screw stops, an axial force applied by the thread crest engaging to the sectors 8a forces them back toward their normal position allowing the aperture 6 as well as the opened slits 8 to contract giving the slitted thread the full carrying capacity.

Thus, the inner edges of sectors 8a tightly grip the screw (not shown) at its root around the entire periphery except for the small portions adjacent the slits 8. Since these slits are opened only very slightly, the screw is gripped around nearly its entire circumference by sectors 8a. This allows the screw to be securely held in every tightened position at every depth of tightening. Thus, no undesired back-rotation of the screw on its own under the influence of vibrations or impacts is possible because the sectors 8a formed by slits 8 engage the core or root of the screw. This renders the fastener 1 of this invention truly self-locking.

The thread 5 in the fastener 1 is formed as follows. Initially the conical portion forming the thread 5 is formed, as by stamping, in the sheet metal plate 1a.

The sheet metal plate is then formed with slits 8 using, for example, suitably shaped knifing or shearing tools, which form the slits 8 substantially without removal of any material from the plate. If the slitting sequence causes the formed sectors 8a to be bent apart from one another, i.e., alternately deflected transversely relative to the plane of the metal plate 1a, sectors 8a are bent back so that their lateral edges are contiguous with one another as shown in FIGS. 1 and 2.

Finally, the thread aperture 6 is punched out of the conical thread so that the dimension of aperture 6 is about 5% less than the core or root diameter of the screw to be used therewith.

Figure 3:
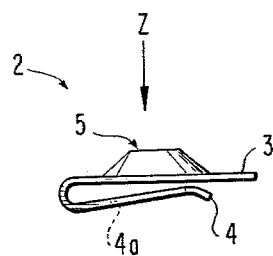
FIG. 3 is an elevational view showing U-shaped, bent clamp member including a sheet-metal fastener of this invention, and being the preferred embodiment of this invention.
Figure 4:
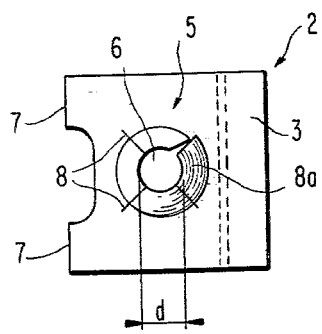
FIG. 4 is a top plan view of FIG. 3.

The sheet-metal fastener of the preferred embodiment shown in FIGS. 3 and 4, is formed as part of a U-shaped, bent, sheet-metal clamp generally indicated at 2. This clamp 2 includes an upper portion or plate 3 and a lower or return-bent plate 4 connected by legs 7.

The upper plate 3 is formed substantially the same as plate 1a of the embodiment of FIGS. 1 and 2, including thread 5 at center z, aperture 6, and slits 8 defining sectors 8a. Lower plate 4 has an aperture 4a aligned with aperture 6.

In use, clamp 2 is slipped over the edges of support bases (not shown) to be fastened and with apertures 6, 4a aligned with apertures in the support bases. A screw (not shown) is then passed through aperture 4a and the support bases and is pressed against thread 5 at aperture 6. A screwdriver, or other suitable tool, is then used to turn the screw causing it to advance along thread 5, as described hereinbefore.

It will be apparent to those skilled in the art that various additions, substitutions, modifications, variations and omissions can be made to the fastener of this invention without departing from the scope or spirit of the invention.

What is claimed is:

1. A fastener comprising a sheet-metal plate having a central stamped portion shaped to define an internal screw thread formed by an aperture, said stamped portion having a plurality of slits extending generally radially of said aperture and spaced generally equally around said thread forming a plurality of independent substantially equally sized sectors, said slits being gapless and the lateral edges of said sectors being contiguous, said aperture having a mean diameter sized smaller than the root diameter of a screw to be used therewith.

2. A fastener as defined in claim 1 wherein said aperture mean diameter is approximately 5% less than the root diameter of said screw.

3. A fastener as defined in claim 1 wherein said sheet metal plate forms the upper plate of a generally U-shaped sheet metal clamp which includes upper and lower sheet-metal connected plates adapted to slip over base supports to be fastened, and said lower plate having an aperture aligned with the aperture in said upper plate.

4. The method of making a fastener which comprises a sheet metal plate having a central stamped conical portion shaped to define an internal screw thread formed by an aperture, said stamped portion having a plurality of slits extending generally radially of said aperture and spaced generally equally around said thread forming a plurality of independent substantially equally sized sectors, said slits being gapless and the lateral edges of said sectors being contiguous, said aperture having a means diameter sized smaller than the root diameter of a screw to be used therewith; said method comprising the steps of forming said conical portion in said sheet metal plate, slitting said conical portion radially to thereby define said plurality of independent sectors having contiguous lateral edges, and then forming said central aperture in said slitted conical portion.

* * * * *